US006525856B1

(12) United States Patent
Maruyama et al.

(10) Patent No.: US 6,525,856 B1
(45) Date of Patent: Feb. 25, 2003

(54) IMAGE DISPLAY APPARATUS

(75) Inventors: Tetsuo Maruyama, Tokyo (JP); Masao Tsuchiya, Kanagawa (JP); Masahisa Goto, Tokyo (JP); Takahi Otobe, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/330,893

(22) Filed: Jun. 11, 1999

(30) Foreign Application Priority Data

Jun. 26, 1998 (JP) .......................................... 10-180974

(51) Int. Cl.⁷ .......................... H04B 10/00; H04B 10/02
(52) U.S. Cl. ........................................ 359/173; 359/152
(58) Field of Search ................................ 359/117, 131, 359/146, 152, 161, 173; 345/1.1, 2.1, 2.3

(56) References Cited

U.S. PATENT DOCUMENTS 5,506,716 A * 4/1996 Mihara et al. .............. 359/152
5,612,741 A * 3/1997 Loban et al. ................ 348/383
5,629,714 A * 5/1997 Nishitani et al. .............. 345/1

* cited by examiner

*Primary Examiner*—Leslie Pascal
*Assistant Examiner*—Dalzid Singh
(74) *Attorney, Agent, or Firm*—Bell, Boyd & Lloyd LLC

(57) ABSTRACT

In an image display apparatus, an image data supply means is readily connected with an image display means through a channel, which are installed at positions remote from each other. The present invention provides an image data supply means for supplying image data, an optic-spatial transmission means on a transmission side for emitting optical beam which is modulated in accordance with the image data, optic-spatial transmission means on a reception side for receiving the optical beam emitted by the optic-spatial transmission means on the transmission side, and demodulating the optical beam to recover the image data, and an image display means for displaying an image based on the image data recovered by the optic-spatial transmission means on the reception side.

9 Claims, 8 Drawing Sheets

IMAGE DISPLAY APPARATUS

BACKGROUND OF THE INVENTION

1. Field of the Invention

This invention relates to an image display apparatus, and more particularly, is suitably applied to an image display apparatus for supplying desired video data to a large video device used on the roof of a building, in an event site, or the like.

2. Description of the Related Art

A large video device having a large display is installed on the roof of a building, in an event site, or the like for displaying video images mainly for purposes of advertisement. A variety of commercial video images are simultaneously viewed by a large number of people with the large video device to achieve immense effects of advertisement.

As illustrated in FIG. 1, for example, a large video display system 100 has a variety of components installed at sites remote from each other, where the components are connected by cables 101 such as communication cables made of twisted copper fine lines, coaxial cables and optical fiber cables. Video sources such as a video tape recorder (hereinafter referred to as the "VTR") 102 and a digital video disk player (hereinafter referred to as the "DVD") 103 are switched by a switcher 104 to display a reproduced image on a large video device 105.

The large video display system 100 needs to be generally controlled by a person being in charge of this system with a main control unit 106 and a monitor 107 connected to the main control unit 106 in order to perform operations such as the control in accordance with the status of a video image reproduced by the large video device 105 and respective components of the system, and a recovery operation in case the system 100 fails.

In the above-mentioned large video display system 100, when the large video device 105 is installed in a building being remote beyond a street from a building having the main control unit 106 and the switcher 104 installed, the cables 101 must be placed by aerial-placing the cables 101 or by burying the cables 101 underground because respective components are connected by wired channels.

For aerial-placing the cables 101, for example, existing architectural structures such as poles may be utilized in many cases. For this purpose, however, the permission of the owner has to be obtained to utilize such architectural structures, and a large amount of fee will be charged for the rent. In addition, appropriate architectural structures are not always found at locations optimal to the aerial-placing of the cables 101. For newly constructing aerial cable placing facilities, a variety of applications must be made to the authorities for permission to the construction of such facilities, and a long construction term will be required.

On the other hand, for burying the cables 101 underground, similar authorization must be obtained for the construction work, and the construction work may often be limited in terms of the time depending on sites. In addition, the construction work will largely affect the civic life because of obstacle to the-traffic, tremendous noise caused thereby, and so on. As appreciated, the placing of the cables 101, in either of aerial or buried forms, for constructing the large video display system 100 involves a large number of working steps, a great deal of labor, and a long time, thus implying a problem in the lack of smooth progress in installing the system.

Furthermore, since the large video display system 100 constitutes a single closed system, difficulties are encountered for connection of the system 100 with another system located at a different site. Thus, a display associated with a large video device in another system would suffer from problems in that the same video sources must be provided in the other system, and very troublesome operations are required therefor.

SUMMARY OF THE INVENTION

In view of the foregoing, an object of this invention is to provide an image display apparatus which is capable of readily connecting an image data supply means and an image display means, which are located remotely from each other, by channels, and of offering a high usability.

The foregoing object and other objects of the invention have been achieved by the provision of an image display apparatus which comprises an image data supply means for supplying image data, an optic-spatial transmission means on a transmission side for emitting optical beam modulated in accordance with the image data, an optic-spatial transmission means on a reception side for receiving the optical beam emitted by the optic-spatial transmission means on the transmission side, and for demodulating the optical beam to recover the image data, and an image display means for displaying an image based on the image data recovered by the optic-spatial transmission means on the reception side.

Image data supplied from the image data supply means is converted into an optical beam which is then emitted, and the optical beam, when received, is demodulated to recover the image data which is then displayed on the image display means, so that even if the image data supply means and the image display means are installed at positions remote from each other, the image data can be optic-spatially transmitted. Therefore, a channel connection can be readily achieved without laborious and time-consuming works such as aerial-placing or underground installation of wired channels.

The nature, principle and utility of the invention will become more apparent from the following detailed description when read in conjunction with the accompanying drawings in which like parts are designated by like reference numerals or characters.

DETAILED DESCRIPTION OF THE EMBODIMENT

Figure 1:
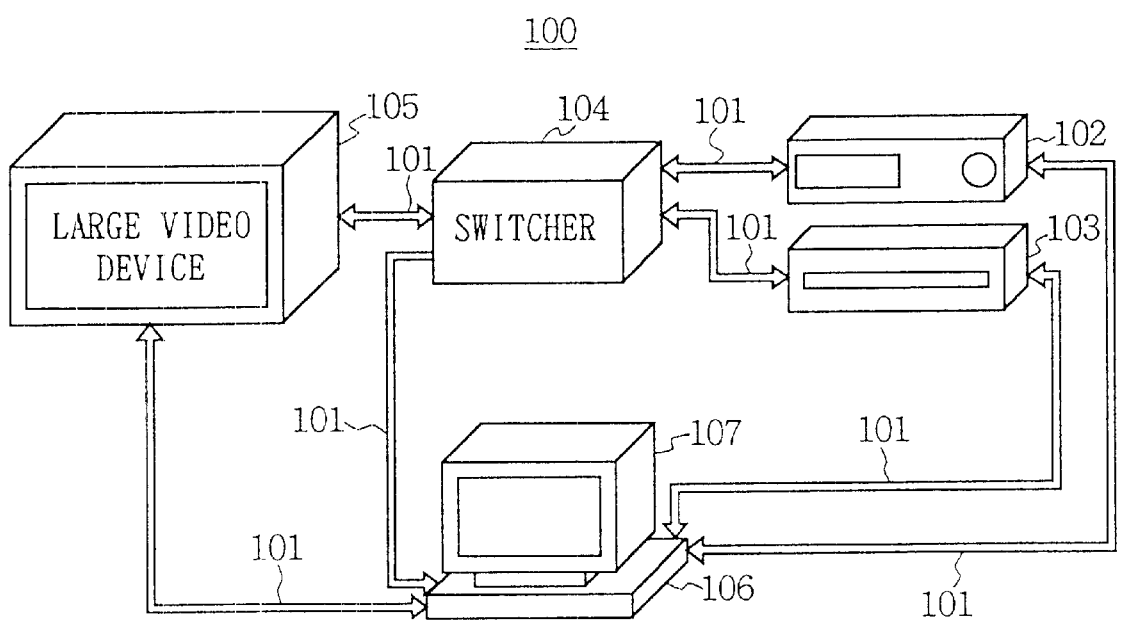
FIG. 1 is a schematic diagram illustrating the configuration of a conventional large video display system.
Figure 2:
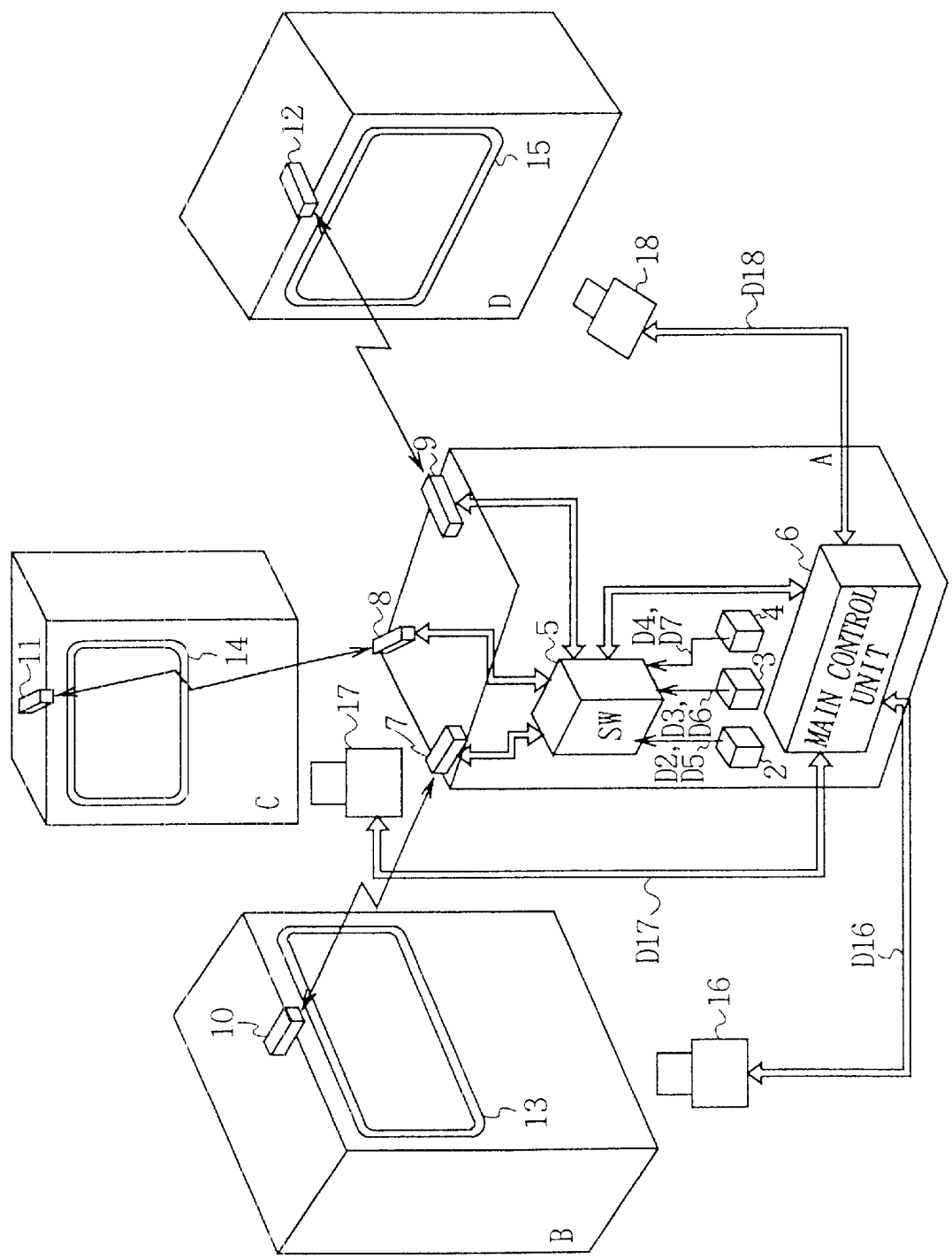
FIG. 2 is a schematic diagram illustrating the configuration of a large video display system according to one embodiment of the present invention.

Preferred embodiments of this invention will be described with reference to the accompanying drawings:

Referring to FIG. 2, numeral 1 generally shows a large video display system according to one embodiment of the present invention. Video data D2 to D4 and control data D5 to D7 corresponding to the video data D2 to D4 are respectively outputted to a switcher 5 from video supply units 2 to 4 each comprising a VTR installed in a building A. The switcher 5 selects the video data D2 to D4 and the control data D5 to D7 based on control of a main control unit 6 to send selected data to optical radio transmission devices 7 to 9.

For reference, the control data D5 to D7 may be a variety of information such as information indicating whether the video data D2 to D4 are still images or moving images, luminance information for controlling the brightness of the screen in accordance with the video data D2 to D4, and information indicative of the type of sound.

The switcher 5 can send the video data D2 to D4 and the control data D5 to D7 to the optical radio transmission devices 7 to 9 in an arbitrary combination based on control of the main control unit 6, for example, supplying all of the optical radio transmission devices 7 to 9 with the video data D2 and the control data D5 outputted from the video supply unit 2, supplying only the optical radio transmission device 7 with the video data D2 and the control data D5 outputted from the video supply unit 2, supplying only the optical radio transmission device 8 with the video data D3 and the control data D6 outputted from the video supply unit 3, and supplying only the optical radio transmission device 9 with the video data D4 and the control data D7 outputted from the video supply unit 4.

The optical radio transmission devices 7 to 9 have respective destinations determined for their laser light. An optical radio transmission device 10 is installed on a building B to have the same optical axis as the optical radio transmission device 7 on the building A; an optical radio transmission device 11 is installed on a building C to have the same optical axis as that of the optical radio transmission device 8 on the building A; and an optical radio transmission device 12 is installed on a building D to have the same optical axis as the optical radio transmission device 9 on the building A.

Figure 3:
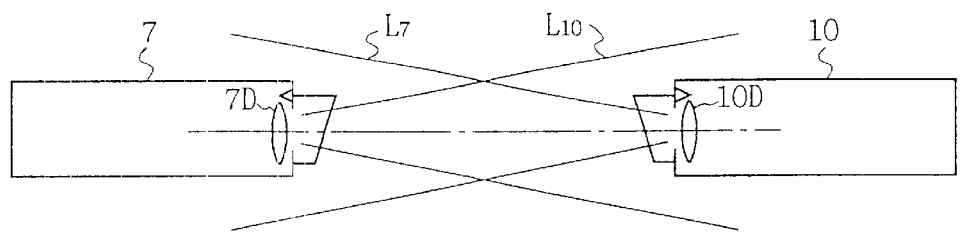
FIG. 3 is a schematic diagram illustrating the configuration of an optical radio transmission device.

In this situation, as illustrated in FIG. 3, the optical radio transmission device 7 on one side, for example, has the same optical axis as the optical radio transmission device 10 on the opposite side, such that laser light intensively modulated based on a transmission signal is emitted by the optical radio transmission device 7 on the one side through a lens 7D as emitted light L7 which is incident on the optical radio transmission device 10 on the opposite side through a lens 10D.

Similarly, the optical radio transmission device 10 on the opposite side also emits laser light intensively modulated in a manner similar to the optical radio transmission device 7 through the lens 10D as emitted light L10 which is incident on the optical radio transmission device 7 through the lens 7D. In addition, the optical radio transmission devices 7, 10 are designed to provide optic-spatial transmission at a transmission rate according to a required image quality with laser light intensively modulated by basebands of the video data D2 to D4 and the control data D5 to D7, or laser light intensively modulated by a carrier wave having a predetermined frequency.

In this way, the optical radio transmission devices 10 to 12 installed respectively on the buildings B to D receive the emitted light L7 to L9 transmitted thereto from the associated optical radio transmission devices 7 to 9 on the building A, respectively. Then, each of the optical radio transmission devices 10 to 12 photoelectrically converts the received emitted light L7 to L9 from the associated optical radio transmission device 7 to 9 to take out a received signal. And after converting the received signal into a digital signal, it decodes the digital signal to take out the video data D2 to D4 and the control data D5 to D7, and displays a video image on a large video device 13 to 15 based on the reproduced video and control data.

The large video display system 1 further comprises monitor cameras 16 to 18 for monitoring conditions of images, i.e., light emitting conditions of pixels on the large video devices 13 to 15 on the buildings B to D each having a liquid display, a cathode-ray tube (CRT) monitor, or the like. And the monitor cameras are placed at predetermined positions near the associated large video devices 13 to 15, and send video data D16 to D18 captured thereby to the main control unit 6 in the building A through wired lines such as optical fiber cables, respectively. In this connection, if the monitor cameras 16 to 18 are connected to the optical radio transmission devices 10 to 12 respectively, the video data D16 to D18 may be transmitted from the optical radio transmission devices 10 to 12 to the main control unit 6 in the building A via the optical radio transmission devices 7 to 9.

It should be noted that the large video devices 13 to 15 are designed to provide a quick response for displaying the video data D2 to D4 transmitted thereto, so that they can also cope with displaying moving images.

Here, since the monitor cameras 16 to 18 can rotate, they can not only monitor image conditions on the large video devices 13 to 15 but also capture situations around the large video devices 13 to 15, for example, capture people watching advertisements displayed on the large video devices 13 to 15.

This enables the main control unit 6 to transmit the video data D16 to D18 supplied from the monitor cameras 16 to 18, from the optical radio transmission devices 7 to 9 to the optical radio transmission devices 10 to 12 through the switcher 5, thereby making it possible to display situations around the large video devices 13 to 15 on the large video devices 13 to 15.

In continuation, description will be made on the circuit configuration of the optical radio transmission devices 7 to 9 and 10 to 12. Since the optical radio transmission devices 7 to 9 and 10 to 12 all have the same circuit configuration, reference will be made on the optical radio transmission device 7 when data transmission is described, while reference will be made on the optical radio transmission device 10 when data reception is described, and description on the remaining devices will be omitted.

Figure 4:
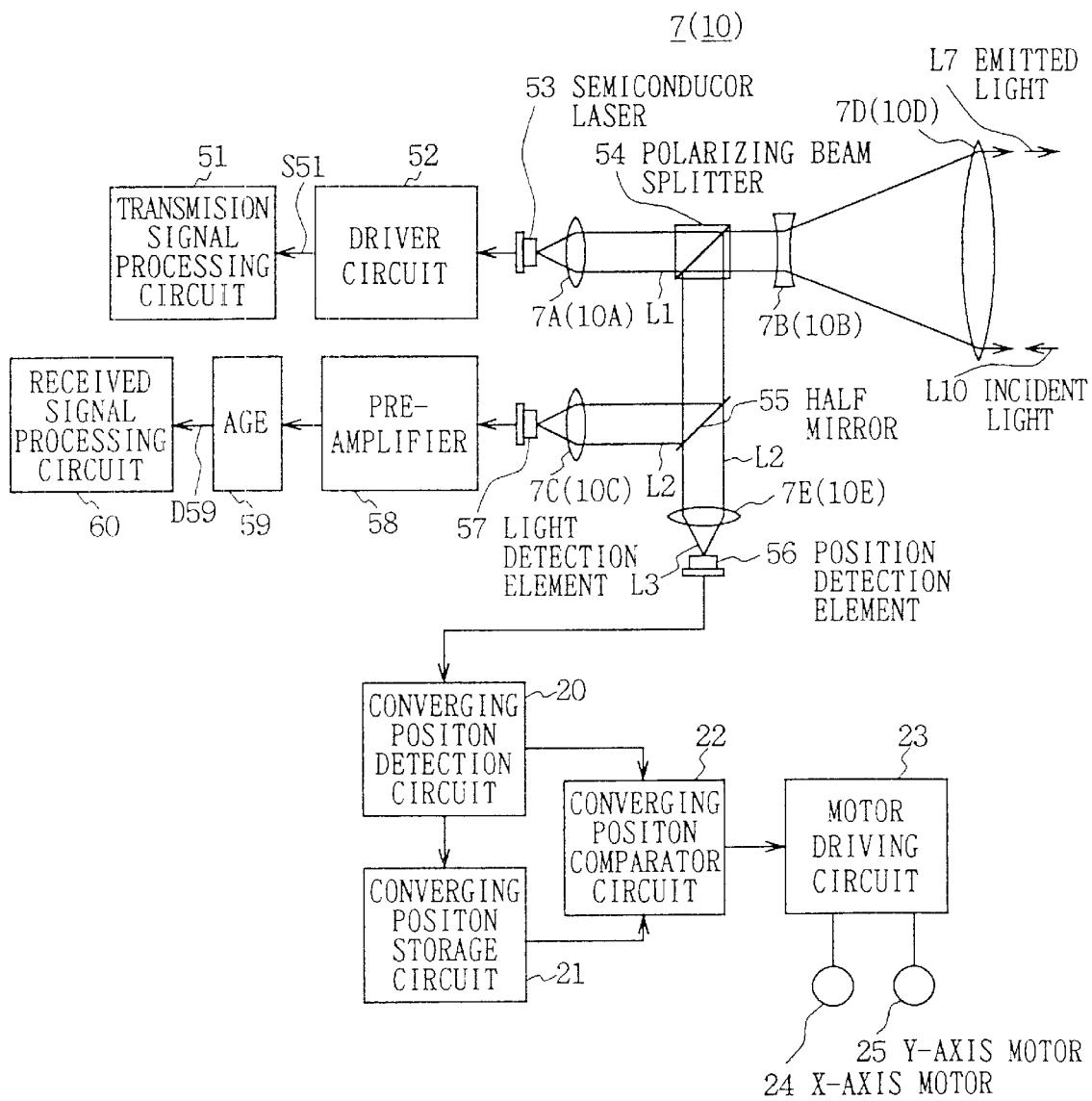
FIG. 4 is a block diagram illustrating the circuit configuration of the optical radio transmission device.

As shown in FIG. 4, upon transmission of data, the optical radio transmission device 7 multiplexes video data D2 and control data D5 supplied from the video supply unit 2 by means of a transmission signal processing circuit 51 to produce transmission data. Then, the optical radio transmission device 7 directly modulates a modulation carrier with the transmission data or modulates the modulation carrier with a frequency corresponding to the bit rate of the transmission data, to produce a modulated signal S51 which is sent to a driver circuit 52.

The driver circuit 52 intensively modulates the laser light from a semiconductor laser 53 based on the modulated signal S51, and sends the intensively modulated laser light to a lens 7A. Specifically, the optical radio transmission device 7 employs the semiconductor laser 53 that emits laser light at wavelength of 1500 nm to 1600 nm.

The lens 7A transforms the laser light to collimated light L1 having a uniform diameter, and makes the collimated light L1 be incident on a lens 7B through a polarizing beam splitter 54. The lens 7B enlarges the collimated light L1 and then makes the enlarged collimated light L1 be incident on a lens 7D. The lens 7D again converts the enlarged collimated light L1 into collimated light that is emitted as emitted light L7.

Upon receipt of data, on the other hand, the optical radio transmission device 10 receives the laser light, i.e., the emitted light L7 transmitted thereto from the optical radio transmission device 7 on the opposite side, through a lens 10D as incident light L10, and limits the incident light L10 through the lens 10D. Then, the optical radio transmission device converts the limited incident light L10 into collimated light L2 having a uniform diameter through a lens 10B. The collimated light L2 reflects on a polarizing beam splitter 54 and then on a half mirror 55, and then is converged onto a light detection element 57 through a lens 10C.

The light detection element 57 photoelectrically converts the converged optical beam into an electrical signal that is sent to a preamplifier 58. The preamplifier 58 amplifies the electrical signal to a predetermined level, and then sends the amplified electrical signal to an automatic gain control (AGC) circuit 59. The AGC circuit 59 adjusts the gain of the electrical signal to reshape the electrical signal, digitizes the reshaped electrical signal, and sends the digitized electrical signal to a received signal processing circuit 60 as received data D59.

The received signal processing circuit 60 decodes the received data D59 to recover the original video data, and displays a video image on the large video device 13 based on the recovered video data. Specifically, the received signal processing circuit 60, which contains a memory (not shown) for storing one frame of recovered video data, detects whether or not data errors are present in each frame of video data sequentially stored in the memory. If data errors are present, the received signal processing circuit 60 cancels to read its one frame of video data, and reads the next frame which is displayed on the large video device 13. In this event, however, the cancelled frame of video will not cause any problem because lack of one frame cannot be recognized by human's eyes.

Figure 5:
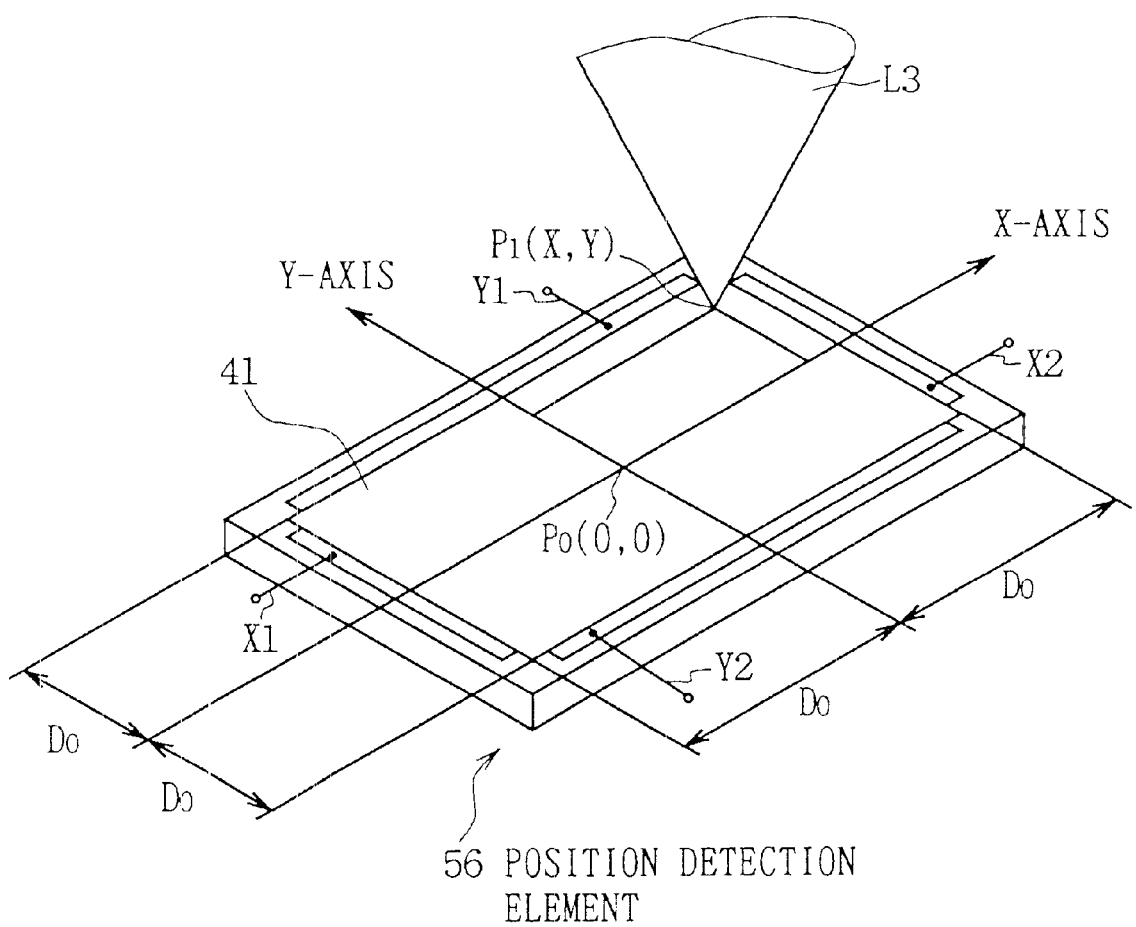
FIG. 5 is a schematic perspective view illustrating the structure of a position detection element.

The half mirror 55 limits the collimated lens L2 through a lens 10E, and converges this onto a position detection element 56 as limited light L3. Here, the position detection element 56 has a light receiving surface 41 which is rectangular with four sides each having an electrodes X1, X2, Y1, or Y2, as illustrated in FIG. 5. A set of electrodes disposed on sides opposite to each other are associated by one axis (for example, the X-axis), while the other set of electrodes disposed on the sides orthogonal to the former axis are associated by the other axis (for example, the Y-axis).

Assuming herein that the center of the light receiving surface 41 is the origin $P_0$ (0, 0) and a converging point for the limited light L3 is at $P_1$ (X, Y), measurements of output currents are individually made in the X-axis and Y-axis directions, which have been produced by irradiation of the limited light L3. Specifically, assuming that the electrode X1 provides an output current IX1; the electrode X2, an output current IX2; the electrode Y1, an output current IY1; and the electrode Y2, an output current IY2, and that the length of each side is $2D_0$, the converging point $P_1$ is expressed by the coordinate value of the following expression (1):

$$X = \frac{D_0(IX2 - IX1)}{(IX2 + IX1)} \quad (1)$$

$$Y = \frac{D_0(IY2 - IY1)}{(IY2 + IY1)} \quad (2)$$

The converging position on the light receiving surface 41 can be calculated with the foregoing expressions (1) and (2).

Figure 6:
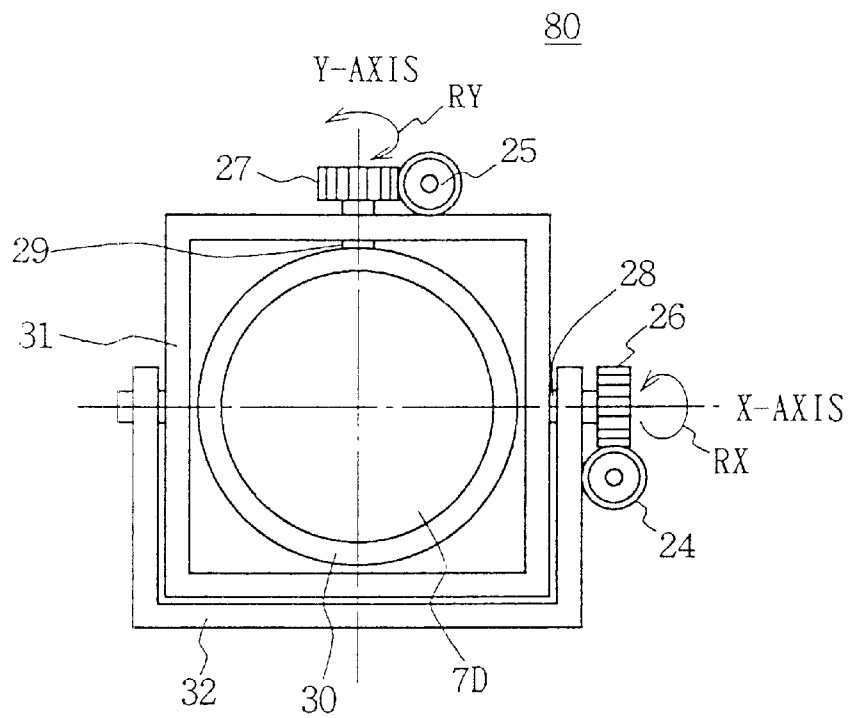
FIG. 6 is a schematic diagram illustrating an optical axis adjustment mechanism.

In continuation, description will be made on the structure of an optical axis adjustment mechanism for automatically adjusting an optical axis based on the positional information on the converging point of the limited light L3 converged on the position detection element 56. As illustrated in FIG. 6, the optical axis adjustment mechanism 80 has a barrel 30, equipped with an optical system including the lens 7D, which is rotatably held in an inner frame 31 on a Y-direction rotating shaft 29. The inner frame 31 in turn is rotatably held in an outer frame 32 on an X-direction rotating shaft 28.

An X-axis gear 26 is co-axially fixed on the X-direction rotating shaft 28 for transmitting rotations of an X-axis motor 24 fixed on the outer frame 32 to the X-direction rotating shaft 28. Likewise, a Y-axis gear 27 is co-axially fixed on the Y-direction rotating shaft 29 for transmitting rotations of a Y-axis motor 25 fixed on the inner frame 31 to the Y-direction rotating shaft 29.

The optical radio transmission device 7 having the above-mentioned optical axis adjustment mechanism 80 should be set such that the position at which the limited light L3 is converged coincides with the origin $P_0$ (0, 0) when the optical axis of the emitted light L7 emitted by the optical radio transmission device 7 is the same as that of the incident light L10 transmitted from the optical radio transmission device 10 on the opposite side on the light receiving surface 41 of the position detection element 56.

However, in the optical axis adjustment mechanism 80, because of generally difficulties in adjustment, the position at which the limited light L3 is converged at the time when the optical axes are the same is taken here as a reference converging point $PXY_0$ ($X_0$, $Y_0$), and the converging point $PXY_0$ ($X_0$, $Y_0$) is previously stored in a converging position storage circuit 21 (FIG. 4).

If the optical axes of the emitted light L7 and the incident light L10 shift from each other for some reason, the converging position on the position detection element 56 is detected by the converging position detection circuit 20 on the coordinate axes, and the detection result is stored in the converging position storage circuit 21.

A converging position comparator circuit 22 reads from the converging position storage circuit 21 the position of shifted optical axis, detected by the converging position detection circuit 20, and the previously stored converging point $PXY_0$ ($X_0$, $Y_0$), to calculate the difference in distance between the two positions, and sends the calculation result to a motor driving circuit 23.

The motor driving circuit 23 drives the X-axis motor 24 and the Y-axis motor 25 in accordance with the calculation result to adjust the radiation angle of the incident collimated light L2, i.e., the optical axis. In this way, each of the optical radio transmission devices 7 and 10 automatically performs the foregoing optical axis control, thereby making it possible to always maintain the state in which their optical axes are the same.

It is generally known that in the optic-spatial transmission for transmitting signals over a long distance, the ratio of carrier power to noise power (C/N ratio) during signal transmission is affected by the atmosphere which is the medium for transmission. The influence due to the atmosphere is mainly caused by an attenuation factor associated with scattering or the like, so-called beam dancing such as heat waves, associated with a swing of refractive index in the air, and interaction of spectrum absorption of the atmosphere with a swing of the oscillation spectrum of a semiconductor laser serving as a light source.

Here, reducing the diameter of a beam can cope with the attenuation factor associated with scattering or the like to some extent. Further, the above-mentioned optical axis adjustment mechanism 80 can cope with the slow beam dancing associated with the swing of refractive index in the air to some extent. However, an approach as described below must be taken for coping with the noise produced by the interaction between the spectrum absorption of the atmosphere with the swing of the oscillation spectrum of a semiconductor laser.

Figure 7:
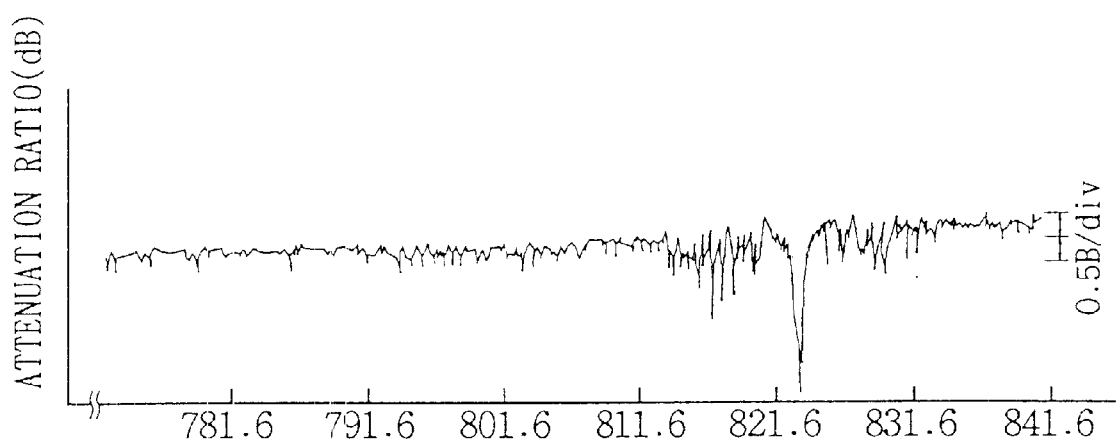
FIG. 7 is a schematic diagram illustrating the absorption spectrum by the atmosphere.

Prior to description on this approach, the interaction will be explained first. For example, as illustrated in FIG. 7, the wavelength absorption spectrum in the atmosphere can be recognized many times, for example, in a band ranging from 780 nm to 830 nm which is frequently used as laser oscillation wavelength in the optic-spatial transmission. FIG. 7 illustrates the wavelength absorption spectrum in the atmosphere around 770.0 nm to 841.6 nm.

Assume herein that a semiconductor laser oscillator oscillating at a single wavelength, such as in a single vertical mode, is used as a light source. If an oscillating wavelength shift resulting from the temperature characteristic or the like causes the oscillating wavelength of the semiconductor laser oscillator to coincide with the absorption wavelength of the wavelength absorption spectrum in the atmosphere (FIG. 7), the laser power is attenuated by the absorption wavelength and the C/N ratio is deteriorated. However, in actual long distance optic-spatial transmission, it has been recognized that violent noise is increased with good repeatability by far in excess of the deterioration in the C/N ratio due to attenuated optical power caused by the absorption.

Further, since the level of a transmission signal is reduced as the transmission signal is absorbed, its C/N ratio will be severely degraded due to synergy effects of the phenomena mentioned above. Since such noise occurs with a wavelength shift due to the temperature characteristic of the semiconductor laser, fluctuations in temperature causes the noise to gradually increase in the transmission signal which would otherwise be normally transmitted without any problem. After such noisy state prevails for a while, the normal transmission signal is again gradually recovered. Since the noise is related to the absorption of the atmosphere, its influence becomes exponentially more grave as the transmission distance is extended.

Figure 8:
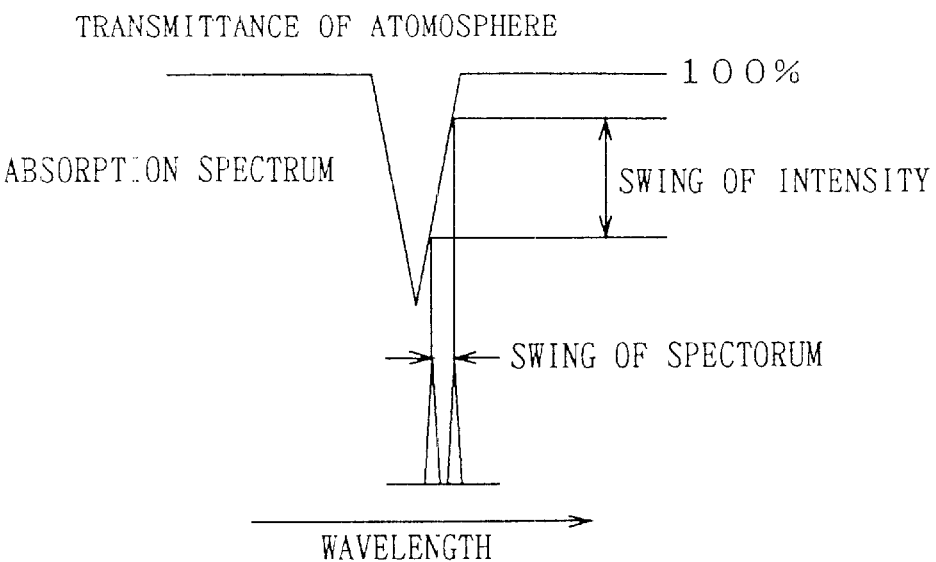
FIG. 8 is a schematic diagram explaining how noise is increased by spectrum absorption of the atmosphere.

In the mechanism of the noise produced by the foregoing cause, when the oscillating frequency of the laser falls on a slope of the spectrum absorption characteristic as illustrated in FIG. 8, a swing in the wavelength direction of the laser is converted into a swing in the intensive direction, whereby the swing in the intensity direction is observed as intensity noise by a device at the reception side.

More specifically, even if the oscillating wavelength of the laser exists on an absorption wavelength bandwidth in the atmosphere, a signal carried on laser light at the wavelength will exhibit only a small amount of additional degradation in the C/N ratio unless the wavelength of the laser light does not vary. However, fluctuations in wavelength (i.e., fluctuations in frequency) will be converted into fluctuations in amplitude if the wavelength of the laser light swings or if the wavelength changes over that slope of the absorption spectrum (FIG. 8) due to aging changes or the like of the laser oscillator.

A basic approach to this problem involves preventing the oscillation spectrum of the laser from falling on the absorption spectrum of the atmosphere. A first method for implementing this approach is to force the oscillation wavelength to jump in response to information indicative of a deteriorated C/N ratio sent from the device on the opposite side when the laser oscillation wavelength is approaching the absorption spectrum to cause the C/N ratio to begin deteriorating.

Thus, when the semiconductor laser 53 emits laser light at a wavelength in a range of 1500 nm to 1600 nm as is the case of the present invention, large absorption occurs with the wavelength of approximately 1370 nm as a center due to a very small number of molecules in the atmosphere. However, since this absorption becomes smaller in a wavelength range of 1500 nm to 1600 nm, the oscillation spectrum of the laser will not fall on the absorption spectrum of the atmosphere. The oscillation wavelength may be converted by a method of changing a driving current for the semiconductor laser, a method of changing the temperature of the semiconductor laser, or the like.

It has been recognized that as a second method of reducing the occurrence of the noise, the oscillation of the semiconductor laser in a super multi-mode state has extremely favorable effects. The following two methods may be used for oscillating a semiconductor laser in the super multi-mode state.

Figure 9A:
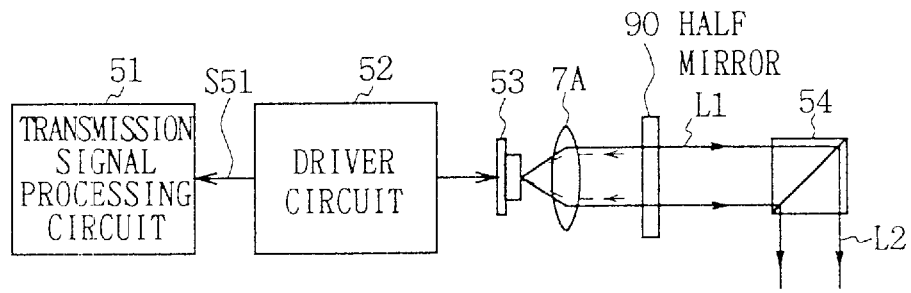
FIGS. 9A and 9B are schematic diagrams explaining methods of oscillating a semiconductor laser in a super multi-mode.

For example, as illustrated in FIG. 9A, in which parts corresponding to those in FIG. 4 are designated the same reference numerals, a first method involves positively and forcibly returning light emitted from the semiconductor laser 53 thereto to produce the super multi-mode state.

In this case, the optical radio transmission device 7 is provided with a half mirror 90 positioned between the lens 7A and the polarizing beam splitter 54, such that the semiconductor laser 53 is oscillated in the super multi-mode state with return light which is forcibly returned to the semiconductor laser 53 through the half mirror 90. It should be noted that a spectrum distribution in the super multi-mode state varies depending on the amount of the return light by the half mirror 90, so that associated constants must be determined in accordance with a particular condition.

Figure 9B:
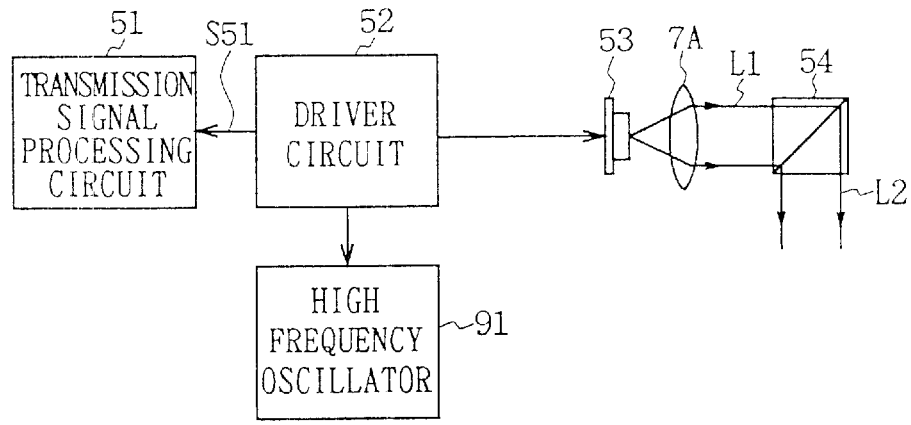

As illustrated in FIG. 9B, in which parts corresponding to those in FIG. 4 are designated the same reference numerals, a second method involves multiplexing a high frequency component on the laser driving current of the driver circuit 52 to produce the super multi-mode state.

In this case, in the optical radio transmission device 7, a high frequency component is multiplexed on a laser driving current of the driver circuit 52 by a high frequency oscillator 91 to oscillate the semiconductor laser 53 in the super multi-mode state. It should be noted that a spectrum distribution in the super multi-mode state varies depending on the frequency and level of the high frequency oscillator 91, so that associated constants must be determined in accordance with a particular condition, as is the case of the first method.

As described above, the optical radio transmission device 7 employs the semiconductor laser 53 which emits laser light at a wavelength in a range of 1500 nm to 1600 nm, which does not fall on the absorption wavelength of the wavelength absorption spectrum and in which a relatively large power density is allowed per unit area, and oscillates the semiconductor laser 53 in the super multi-mode state with any of the first and second methods. Thereby, it is possible to reduce noise produced due to the interaction of the absorption spectrum in the atmosphere with a swing of the oscillation spectrum and to consequently improve the C/N ratio.

Also, the optical radio transmission devices 7 to 9 and the optical radio transmission device 10 to 12 employ the semiconductor laser 53 to optic-spatially transmit laser light at a wavelength equal to or longer than 1.4 μm, so that the emitted laser light will never affect detrimentally to human's eyes, thus improving the safety.

Figure 10:
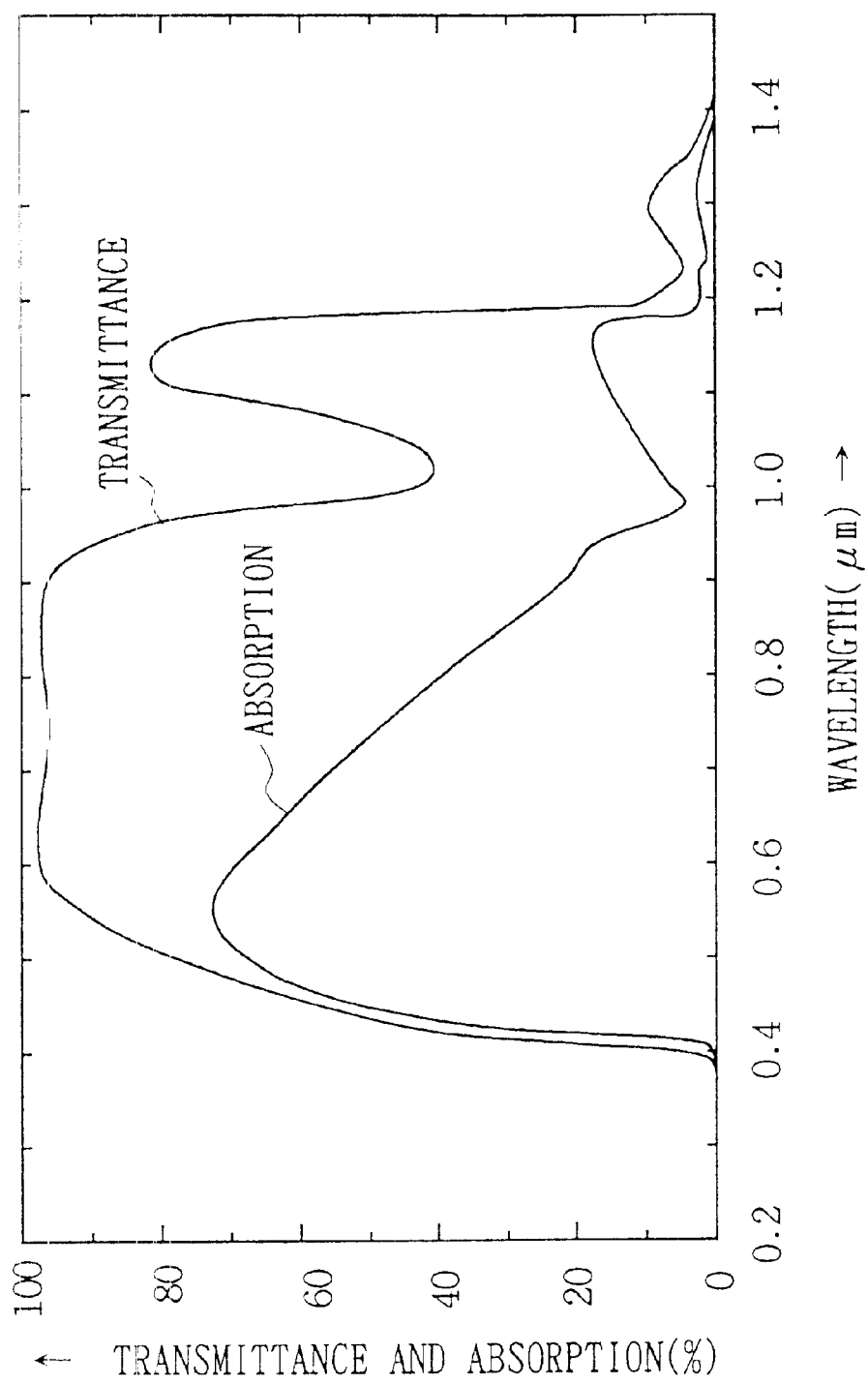
FIG. 10 is a characteristic curve illustrating the rate of transmittance of light entering from the cornea of an eye to the retina and the rate of absorption on the retina.

Next, description will be made on the wavelength of light and its influence on the eyes with reference to FIG. 10. FIG. 10 illustrates the relationship between the transmittance of light entering from a cornea to retinas and the absorptance on the retinas, where both the transmittance and absorptance are assumed to be 100% on the cornea. The graph shows that neither ultraviolet rays nor far infrared rays higher than 1500 nm enter the human's eyes.

On the other hand, the cornea and the crystalline lens are transparent to visible light and near infrared rays in a range of approximately 400 nm to 1200 nm, so that a light converging action of the crystalline lens causes the light intensity per unit area to be extremely high on the retinas. The light absorptance on the retinas is high for blue light, and gradually decreases as the wavelength becomes longer. With longer wavelengths, even if the light reaches the retinas, an absolute amount of absorbed energy is extremely small. It will be appreciated from these facts that laser light at a wavelength equal to or more than approximately 1.4 μm, if employed, will not affect human's eyes and result in an improved safety.

In the large video display system 1 configured described above, when video data D2 to D4 are supplied from the video supply units 2 to 4 installed at positions remote from the large video devices 13 to 15, a transmission signal S51 is light intensity modulated for optic-spatial transmission through the optical radio transmission devices 7 to 9 and the optical radio transmission devices 10 to 12, which are installed such that optical axes of corresponding pairs are aligned with each other, thereby eliminating construction works for aerial-placing or burying optical fibers or the like, which would otherwise be required in the prior art. It is therefore possible to simply and readily supply the video data D2 to D4 in the large video display system 1.

Also, since the large video display system 1 involves the light intensity modulation of the transmission signal S51 for optic-spatial transmission through the optical radio transmission devices 7 to 9 and the optical radio transmission devices 10 to 12, which are installed such that the optical axes of corresponding pairs are aligned with each other, it is possible to avoid a problem of a deteriorated quality of the transmission signal due to over reach (which means that radiations reach another region beyond a target region), reflection on buildings, or the like, as compared with radiation-based spatial transmission of video data. In addition, the video data D2 to D4 can be supplied while maintaining a high quality, without using radiation resources in a situation where establishment of a radiation-based channel is difficult.

Further, since the optical radio transmission devices 7 to 9 and the optical radio transmission devices 10 to 12 each use the optical axis adjustment mechanism 80 to, constantly adjust the optical axes, an optical beam can be prevented from deviating from the light receiving surfaces between the corresponding units, thereby providing stable optic-spatial transmission at all times.

Further, since the optical radio transmission devices 7 to 9 and the optical radio transmission devices 10 to 12 each oscillate the semiconductor laser 53 in the super multi-mode state, it is possible to reduce noise produced due to the interaction of the absorption spectrum of the atmosphere with a swing of the oscillation spectrum to consequently improve the C/N ratio. As a result, high definition video images can be displayed on the large video devices 13 to 15, respectively.

Further, since the large video display system 1 can selectively supply a variety of video sources to a plurality of large video devices 13 to 15 through the switcher 5, the plurality of large video devices 13 to 15 can be controlled by the main control unit 6 to readily display a desired video on any arbitrary one selected from the large video devices 13 to 15, in contrast with a conventional closed system. Thus, the large video display system 1 can accomplish a concentrated control only by means of the main control unit 6 even for a situation where video images, constituting a story, are displayed first on the large video device 13 and then switched sequentially to the large video devices 14, 15 for sequential display.

According to the large video display system 1 in the foregoing configuration, even if the large video devices 13 to 15 are installed at positions remote from the video supply units 2 to 4, the two parties are optic-spatially coupled through pairs of optical radio transmission devices 7 to 9 and 10 to 12, installed to align the optical axes of the two with each other, instead of through wired channels. Therefore, the system can be readily built without the need for large-scale construction works. In addition, high definition video data D2 to D5 can be supplied from the video supply units 2 to 4 to the large video devices 13 to 15 while preventing the video data D2 to D5 from experiencing quality degradation during transmission.

Figure 11:
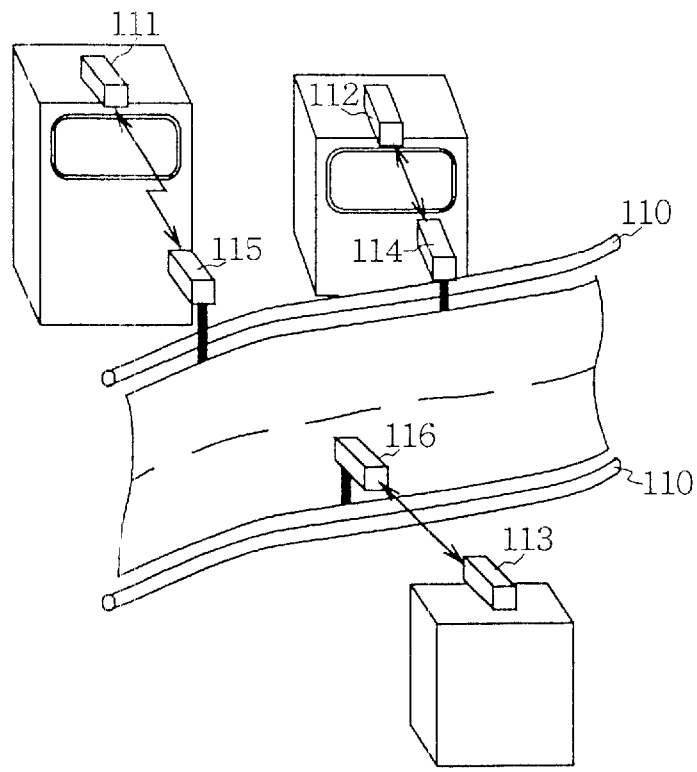
FIG. 11 is a schematic diagram illustrating how optical radio transmission devices are installed along a highway in another embodiment of the present invention.

The foregoing embodiment has been described in connection with the optical radio transmission devices 7 to 9 which are installed as three optic-spatial transmission means on the transmission side respectively disposed at predetermined positions on the building A so as to face the optical radio transmission devices 10 to 12 installed on the buildings B to D as optic-spatial transmission means on the reception side. The present invention, however, is not limited to this particular configuration. Alternatively, as illustrated in FIG. 11, optical fiber cables 110 may be routed along a highway, optical radio transmission devices 111 to 113 may be installed on the roofs of buildings which are respectively provided with a large video device serving as image display means, and optical radio transmission devices 114 to 116 connected to the optical fiber cables 110 may be installed at positions opposite to the optical radio transmission devices 111 to 113, respectively. In this case, video images can be displayed on large video devices readily installed on buildings along the highway.

Figure 12:
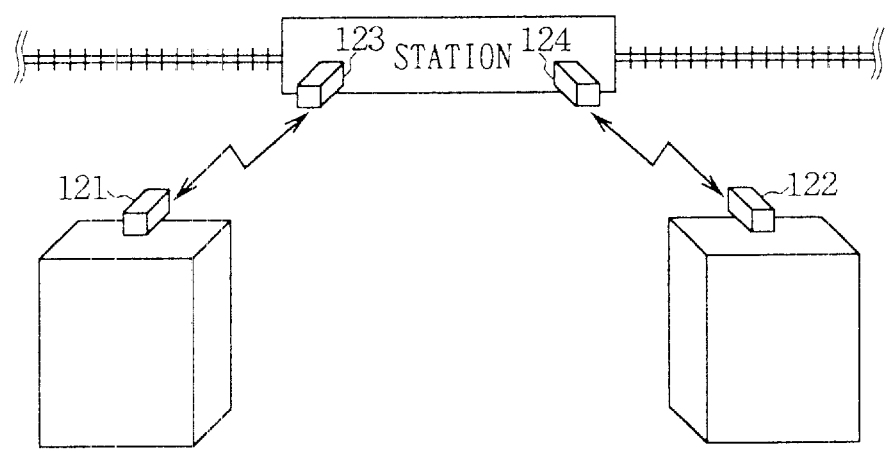
FIG. 12 is a schematic diagram illustrating how optical radio transmission devices are installed in a station in another embodiment of the present invention.

Also, in the foregoing embodiment, the three optical radio transmission devices 7 to 9 are installed on predetermined positions of the building A so as to face the optical radio transmission devices 10 to 12 installed on the buildings B to D, respectively. The present invention, however, is not limited to this particular installation. Alternatively, as illustrated in FIG. 12, optical radio transmission devices 121, 122 may be installed on the roofs of buildings which are respectively provided with a large video display, and optical radio transmission devices 123, 124 may be installed at predetermined positions in a station opposite to the optical radio transmission devices 121, 122, respectively.

Further, while the foregoing embodiment has been described in connection with the semiconductor laser 53 which is used as a light source for emitting laser light as an optical beam, the present invention is not limited to this particular light source, but may employ a variety of other light sources such as a light emitting diode or the like.

Further, while the foregoing embodiment has been described in connection with the video supply units 2 to 4 comprising VTRs which are employed as image supply means for supplying video data D2 to D4, the present invention is not limited to these particular image supply means. Alternatively, a video signal provided by the satellite broadcasting, sent from a communication satellite, may be received and supplied as the video data for the system.

According to the present invention as described above, image data supplied from image data supply means is converted into an optical beam which is emitted, and the optical beam, when received, is demodulated to recover the image data which is then displayed on image display means, so that even if the image data supply means and the image display means are installed at positions remote from each other, the image data can be optic-spatially transmitted. Therefore, a channel connection can be readily achieved without laborious and time-consuming works such as aerial routing or underground installation of wired channels, thus realizing an image display apparatus with a good usability.

While there has been described in connection with the preferred embodiments of the invention, it will be obvious to those skilled in the art that various changes and modifications may be aimed, therefore, to cover in the appended claims all such changes and modifications as fall within the true spirit and scope of the invention.

What is claimed is:

1. An image display apparatus comprising:

image data supply means for supplying image data;

optic-spatial transmission means on a transmission side for emitting optical beam modulated according to said image data;

optic-spatial transmission means on a reception side for receiving said optical beam emitted by said optic-spatial transmission means on the transmission side, and for demodulating said optical beam to recover said image data;

image display means for displaying an image based on said image data recovered by said optic-spatial transmission means on the reception side wherein said image display apparatus includes a plurality of optic-spatial transmission units, each composed of a pair of said optic-spatial transmission means on the transmission side and said optic-spatial transmission means on the reception side, and a plurality of said image display means; and selection means for arbitrarily selecting one or a plurality of optic-spatial transmission units from said optic-spatial transmission units, and for selectively supplying said image data supplied from said image data supply means to one or a plurality of said image display means through said selected one or a plurality of optic-spatial transmission units.

2. The image display apparatus according to claim 1, wherein:

said optic-spatial transmission means on the reception side includes a demodulation unit for receiving an optical beam from said optic-spatial transmission means on the transmission side and demodulating said received optical beam; and said optic-spatial transmission means on the transmission side includes a modulation unit for emitting an optical beam modulated in accordance with data to be transmitted to said optic-spatial transmission means on the reception side.

3. The image display apparatus according to claim 2, wherein said optic-spatial transmission means on the transmission side and said optic-spatial transmission means on the reception side are installed such that optical axes of said two means align with each other for mutual transmission and reception, and said optic-spatial transmission means includes optical axis adjustment means for freely aligning the optical axis thereof with the optical axis of said optic-spatial transmission means on the reception side which is installed in an arbitrary orientation.

4. The image display apparatus according to claim 1, wherein:

said image display apparatus includes a plurality of said image data supply means; and said selection means arbitrarily selects one or a plurality of optic-spatial transmission units from said optic-spatial transmission units, arbitrarily selects said image data supplied respectively from the plurality of said image data supply means through said selected one or plurality of optic-spatial transmission units, and selectively supplies the selected image data to one or a plurality of said image display means.

5. The image display apparatus according to claim 1 wherein said image display apparatus supplies said image display means with control information related to said image data through said optic-spatial transmission units in addition to said image data supplied from said image data supply means.

6. The image display apparatus according to claim 1, wherein:

said image display apparatus includes monitor cameras near said image display means for monitoring conditions of images on said image display means and for monitoring situations around said image display means; and said control means selects image data captured by said monitor camera and said image data of said image data supply means, and supplies said optic-spatial transmission means on the transmission side with selected image data.

7. The image display apparatus according to claim 1, wherein said image display means sequentially stores said image data recovered by demodulating said transmitted opti cal beam on a frame-by-frame basis, detects errors in the data, sequentially reads said image data on a frame-by-frame basis for display, discards a frame including data errors instead of reading the same, and reads and displays the next frame of the image data.

8. The image display apparatus according to claim 1, wherein said optic-spatial transmission means on the transmission side and said optic-spatial transmission means on the reception side prevent noise from being produced due to an interaction of absorption spectrum in the atmosphere with oscillation spectrum of said optical beam.

9. An image display apparatus according to claim 1, wherein said optical beam has a wavelength equal to or more than 1.4 $\mu$m.

* * * * *